United States Patent
Fujioka et al.

(10) Patent No.: US 6,760,297 B2
(45) Date of Patent: Jul. 6, 2004

(54) SUBSTRATE UNIT FOR OPTICAL HEAD AND METHOD FOR MANUFACTURING THE SAME

(75) Inventors: Yoshiharu Fujioka, Zama (JP); Kyoya Matsuda, Yokohama (JP); Akio Onuki, Yokohama (JP); Kunio Omi, Yokohama (JP); Futoshi Ishii, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 257 days.

(21) Appl. No.: 09/959,512

(22) PCT Filed: Mar. 13, 2001

(86) PCT No.: PCT/JP01/01977

§ 371 (c)(1),
(2), (4) Date: Oct. 29, 2001

(87) PCT Pub. No.: WO01/69597

PCT Pub. Date: Sep. 20, 2001

(65) Prior Publication Data

US 2002/0159379 A1 Oct. 31, 2002

(30) Foreign Application Priority Data

Mar. 15, 2000 (JP) ........................................ 2000-071920
Dec. 22, 2000 (JP) ........................................ 2000-390020

(51) Int. Cl.[7] ................................................. G11B 7/00
(52) U.S. Cl. ............................. 369/112.29; 369/112.27; 369/44.12; 369/121
(58) Field of Search ......................... 369/44.11, 44.12, 369/44.14, 44.23, 44.27, 112.01, 112.27, 112.29, 116, 121

(56) References Cited

U.S. PATENT DOCUMENTS

| 4,823,331 A | 4/1989 | Yoshitoshi et al. |
| 4,893,296 A | 1/1990 | Matsumoto et al. |
| 6,597,642 B1 * | 7/2003 | Ijima et al. .............. 369/44.41 |

FOREIGN PATENT DOCUMENTS

| CN | 1115388 A | 1/1996 |
| JP | 62-279530 | 12/1987 |
| JP | 7-193273 | 7/1995 |
| JP | 9-231303 | 9/1997 |
| JP | 11-066590 | 3/1999 |
| JP | 11-110796 | 4/1999 |
| JP | 11-274654 | 10/1999 |
| JP | 2000-91693 | 3/2000 |

* cited by examiner

Primary Examiner—Muhammad Edun
(74) Attorney, Agent, or Firm—Pillsbury Winthrop LLP

(57) ABSTRACT

There is disclosed a substrate unit comprising a light emitting element attachment surface for attaching a light emitting element which emits laser light substantially in parallel to the attachment surface, a light reflecting surface for changing the direction of the light axis of the laser light emitted from the light emitting element by a predetermined angle by reflection, and a light detecting element attachment surface, formed on the same two-dimensional plane as a plane of the light emitting element attachment surface, for attaching a light detecting element which receives light incident from the outside.

13 Claims, 8 Drawing Sheets

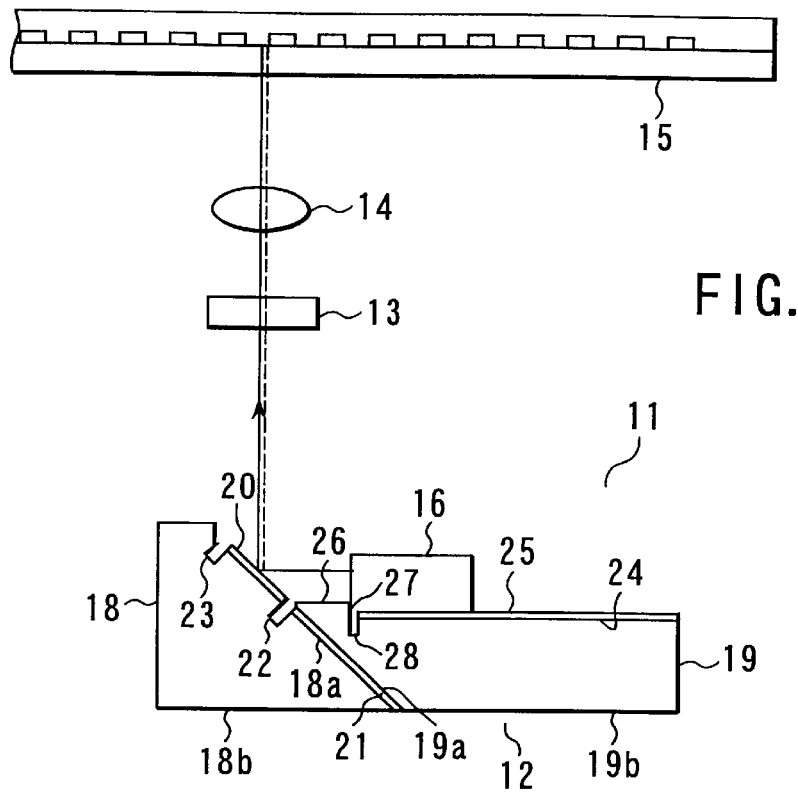
FIG. 1A
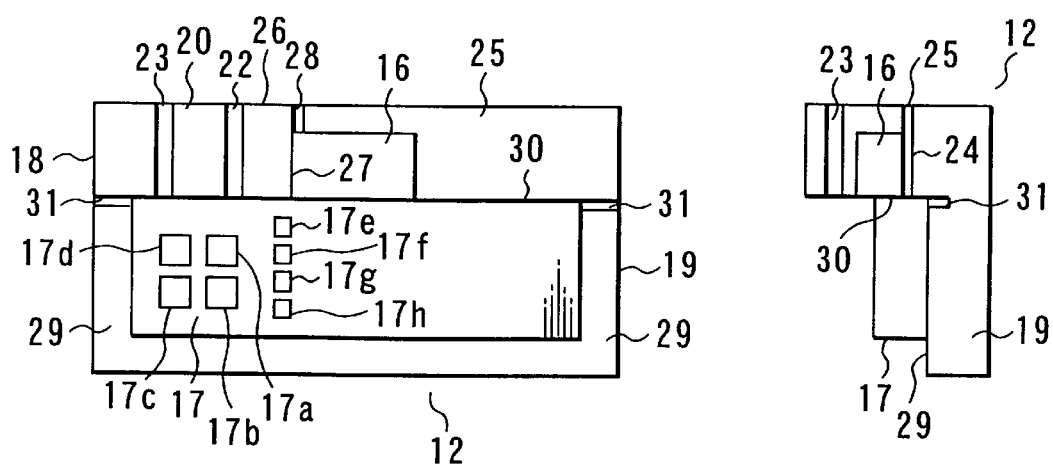
FIG. 1B
FIG. 1C

SUBSTRATE UNIT FOR OPTICAL HEAD AND METHOD FOR MANUFACTURING THE SAME

This application is the National Phase of International Application PCT/JP01/01977 filed Mar. 13, 2001 which designated the U.S. and that International Application was not published under PCT Article 21(2) in English.

TECHNICAL FIELD

The present invention relates to an optical head apparatus for recording or reproducing information in a disc drive for driving optical discs such as a digital video disc (DVD) and a compact disc (CD), particularly to a substrate unit for an optical head preferably applied to a so-called integrated optical unit (hereinafter referred to as IOU) in which a laser diode (hereinafter referred to as LD), a photodiode (hereinafter referred to as PD), a holographic optical element (hereinafter referred to as HOE), and the like are integrated, and to a manufacturing method of the substrate unit.

BACKGROUND ART

As well known, either an LD or PD for use in an optical head apparatus has heretofore been prepared by a manufacturing method similar to a method of forming an element pattern of a semiconductor on a silicon (Si) substrate or a gallium arsenic (GaAs) substrate.

In this case, an LD is constituted to be irradiated with a laser light substantially in parallel to the surface of the substrate with the LD to be formed thereon. Moreover, the PD is constituted so as to receive light vertically incident upon the surface of the substrate with the PD to be formed thereon.

Therefore, in the conventional optical head apparatus, an optical disc is irradiated with the laser light from the LD, and the reflected light is received by the PD. This constitution needs to have a three-dimensional structure in which the LD and PD are disposed adjacent to each other, and the substrate surface with the PD formed thereon is disposed substantially at right angles to the substrate surface with the LD formed thereon.

Additionally, a concrete constitution example of the optical head apparatus having a structure in which LD and PD are arranged in a three-dimensional positional relation in this manner is disclosed, for example, in Jpn. Pat. Appln. KOKAI Publication No. 110796/1999.

Additionally, in order to perform high-reliability recording/reproducing with respect to the optical disc, it is important to accurately drive respective servo systems such as tracking and focus, and it is necessary to set the position relation between the LD and PD with a high precision of 10 μm or less.

Moreover, the substrate with the LD formed thereon is electrically connected to the substrate with the PD formed thereon by wire bonding. In this case, three-dimensional wire bonding needs to be performed.

However, when the LD and PD are subjected to mutual position adjustment, wire bonding, and the like in three dimensions with such high precision, the operation becomes very difficult and intricate. This causes a problem that operation efficiency is deteriorated.

To solve the problem, the present invention has been developed in consideration with the circumstances, and an object thereof is to provide a substrate unit for an optical head apparatus, in which the LD and PD can be disposed on the same two-dimensional plane, thereby an operation for positioning the LD and PD is facilitated, and an operation efficiency of wire bonding can also be enhanced.

Moreover, an object of the present invention is to provide a manufacturing method of the substrate unit for the optical head apparatus, in which the substrate unit for the optical head apparatus can be manufactured with high precision and satisfactory mass productivity.

DISCLOSURE OF THE INVENTION

According to the present invention, there is provided a substrate unit for an optical head apparatus, comprising:

a light emitting element attachment surface for attaching a light emitting element which emits a laser light substantially in parallel to the surface with the element to be attached thereto;

a light reflecting surface for changing a direction of a light axis of the laser light emitted from the light emitting element attached to the light emitting element attachment surface by a predetermined angle by reflection; and a light detecting element attachment surface, formed on the same two-dimensional plane as a plane of the light emitting element attachment surface, for attaching a light detecting element which receives a light incident from the outside.

According to the aforementioned constitution, since the light emitting element and light detecting element can be disposed on the same two-dimensional plane, an operation for positioning the light emitting element and light detecting element can be facilitated, and an operation efficiency of wire bonding can also be enhanced.

Moreover, according to the present invention, there is provided a manufacturing method of a substrate unit for an optical head apparatus, comprising:

a step of forming a plurality of light reflecting surfaces on one plane of a first member to be processed formed substantially in a rectangular parallelepiped shape;

a step of attaching one plane of a second member to be processed formed substantially in the rectangular parallelepiped shape to the plane of the first member to be processed with the plurality of light reflecting surfaces formed thereon in the forming step, disposing an adhesive medium in a portion other than the light reflecting surface, and forming a bonded block in which the first and second members to be processed are connected to each other;

a step of cutting the bonded block formed in the forming step at a predetermined angle with respect to the light reflecting surface, and dividing the bonded block into a plurality of blocks so that one light reflecting surface is included in each block; and a step of disposing a cut surface of the block obtained in the forming step as a reference surface of a processing, and forming the substrate unit from the block, comprising a light emitting element attachment surface for attaching a light emitting element which emits a laser light to the light reflecting surface, and a light detecting element attachment surface for attaching a light detecting element, formed on the same two-dimensional plane as the light emitting element attachment surface, for receiving light incident from the outside.

According to the manufacturing method, the bonded block formed by connecting the second member to be processed to the first member to be processed with the plurality of light reflecting surfaces formed thereon is cut at the predetermined angle with respect to the light reflecting surface and divided into the plurality of blocks. When the cut surface of the block is disposed as the reference surface of the processing, the substrate unit including the light emitting element attachment surface and light detecting element attachment surface is formed from the block. Therefore, the substrate unit for the optical head apparatus can be manufactured with the high precision and satisfactory mass productivity.

BRIEF DESCRIPTION OF THE DRAWINGS

FIGS. 1A to 1C are a front view, top plan view, and side view showing a first embodiment of a substrate unit for an optical head apparatus according to the present invention, and a manufacturing method of the unit;

BEST MODE FOR CARRYING OUT OF THE INVENTION

Figure 2:
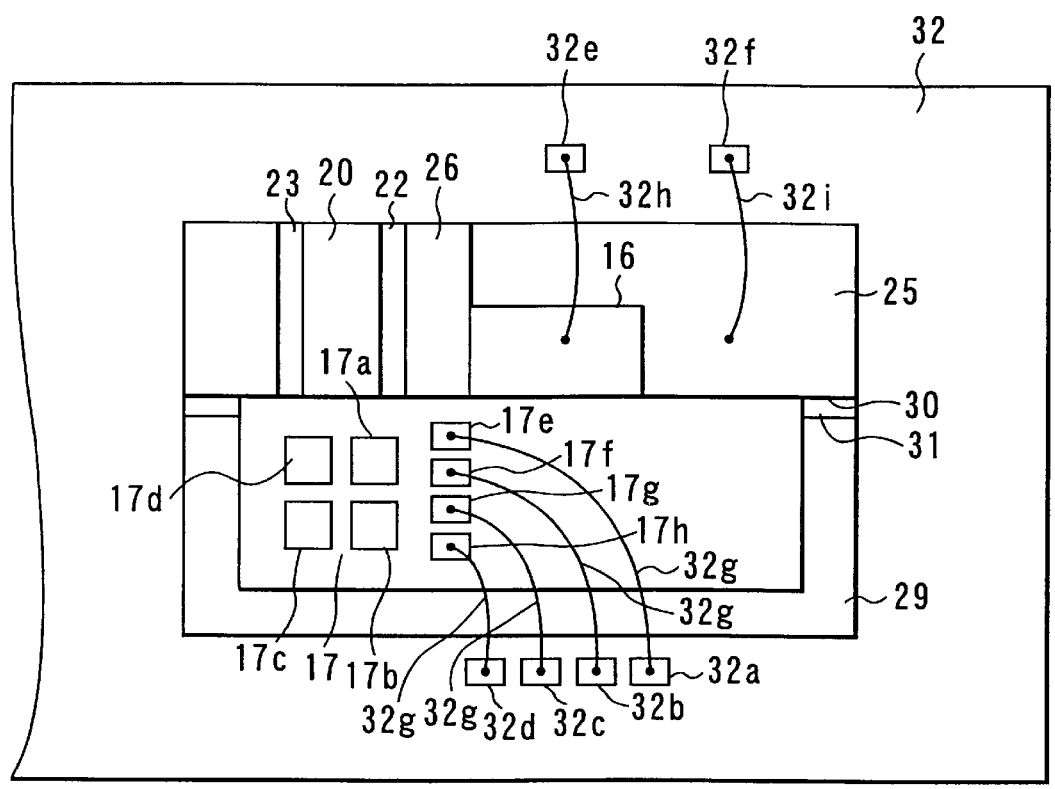
FIG. 2 is a top plan view showing that the substrate unit in the first embodiment is fixed on a wiring substrate.

A first embodiment of the present invention will be described hereinafter in detail with reference to the drawings. FIGS. 1A to 1C show a substrate unit 12 of an optical head apparatus 11 described in the first embodiment.

That is, FIG. 1A shows a state of the substrate unit 12 seen from a front direction together with an HOE 13, objective lens 14 and optical disc 15. FIG. 1B shows a state of the substrate unit 12 seen from a top direction, that is, a direction in which a laser light goes out/in with respect to the optical disc 15. FIG. 1C shows a state of the substrate unit 12 seen from a side direction.

The optical head apparatus 11 has the substrate unit 12 as an attachment base, and an LD 16 as a light emitting element and a PD 17 as a light detecting element are attached to the substrate unit 12. The substrate unit 12 is constituted of a first member 18 and second member 19 formed of insulating materials high in conductivity, such as ceramic, glass and sapphire.

The first member 18 has a section formed substantially in a right-angled triangle shape, and a reflective film plane 20 formed by a thin film of metal or metal oxide is extended to one tip end portion from a middle portion of a slope 18a of the member.

The reflective film plane 20 is constituted by mirror-surface processing the surface of the first member 18 for forming the plane thereon by means such as lapping and polishing, and forming a thin film of metal or metal oxide on the mirror-processed surface, and has a function of totally reflecting a light emitting wavelength of the LD 16.

Moreover, a slope 19a having inclination corresponding to that of the slope 18a of the first member 18 is formed on an end of the second member 19. When the slope 19a of the second member 19 is attached to the slope 18a of the first member 18 by adhesive mediums 21 such as glass, silver wax, solder, and organic adhesive, the first member 18 is bonded to the second member 19. Alternatively, the first member 18 is bonded to the second member 19 by diffusion bonding by heating or pressing.

In this case, the first member 18 is bonded to the second member 19 so that bottom surfaces 18b, 19b constitute the same plane. Alternatively, the members are bonded, subjected to processing such as cutting, and formed in the same plane.

A groove 22 is formed along a bonded end of the slope 18a of the first member 18 with the second member 19, and a groove 23 is further formed in an edge of the reflective film plane 20 opposite to the groove 22. In this case, when the first member 18 is bonded to the second member 19, the groove 22 has a function of inhibiting the adhesive medium 21 from permeating onto the reflective film plane 20.

An LD attachment surface 24 is formed on the second member 19, and a conductive film 25 of materials such as gold (Au) is formed on the surface of the LD attachment surface 24 by means such as sputtering, vapor deposition, and plating. The LD 16 is soldered or attached otherwise onto the conductive film 25.

A protrusion 26 projecting from the LD attachment surface 24 is disposed on the second member 19, and an end surface of the protrusion 26 rising from the LD attachment surface 24 constitutes a reference surface 27 for attaching the LD 16. Furthermore, a groove 28 is formed in a direction of the bottom surface 19b along the reference surface 27.

A PD attachment surface 29 extending in the second member 19 is formed adjacent to the reflective film plane 20 of the first member 18. The PD attachment surface 29 is disposed in a position lower than the LD attachment surface 24 in the direction of the bottom surface 19b and substantially in parallel to the LD attachment surface 24.

Therefore, when the LD attachment surface 24 and PD attachment surface 29 are seen from a top surface, two surfaces 24, 29 exist in the same two-dimensional plane.

Here, a case in which two surfaces 24, 29 exist in the same two-dimensional plane includes a case in which the surfaces 24, 29 exist in parallel to each other but at different heights, and a case in which the surfaces 24, 29 exist in the same plane at the same height.

A wall 30 is formed in a boundary with the LD attachment surface 24 by the PD attachment surface 29, and this wall 30 is also a reference surface for attaching the PD 17 to the PD attachment surface 29. Furthermore, a groove 31 is formed in the PD attachment surface 29 along the wall 30 in the direction of the bottom surface 19b.

The PD 17 has not only a reproducing function but also a function of reading a so-called servo signal for accurately tracing a recording pattern of the optical disc 15, and therefore has a plurality of (four in the shown example) light receiving portions 17a to 17d.

Moreover, terminals 17e to 17h for electrically connecting the respective light receiving portions 17a to 17d to an external circuit are formed in the PD 17.

As shown in FIG. 2, the substrate unit 12 with the LD 16 and PD 17 attached thereto is fixed onto a wiring substrate 32. Terminals 32a to 32d to be connected to the respective terminals 17e to 17h of the PD 17, and terminals 32e, 32f to be connected to the LD 16 and conductive film 25 are disposed in the wiring substrate 32.

Moreover, the respective terminals 17e to 17h of the PD 17 are connected to the terminals 32a to 32d via respective wire bondings 32g, the LD 16 is connected to the terminal 32e by a wire bonding 32h, and the conductive film 25 is connected to the terminal 32f by a wire bonding 32i.

In the optical head apparatus 11 constituted as described above, the laser light emitted from the LD 16 is totally reflected by the reflective film plane 20, and the light axis is changed substantially at a right angle. Thereafter, the light is incident upon the objective lens 14 through the HOE 13, and focused on the recording pattern of the optical disc 15. Subsequently, the laser light reflected by the recording pattern is reversed through the objective lens 14, polarized by the HOE 13 and received by the PD 17.

According to the optical head apparatus 11, since the LD attachment surface 24 and PD attachment surface 29 are formed together with the reference surfaces 27, 30 for attachment on the first member 18 and second member 19 integrally connected to each other in the same two-dimensional plane, the LD 16 and PD 17 can precisely and easily be attached.

Moreover, for the wire bonding connection, since a three-dimensional connection place is eliminated, and only a plane connection is sufficient, a simple operation can be performed with simple equipment.

A manufacturing method of the substrate unit 12 will next be described with reference to FIGS. 3 to 7. First in FIG. 3, a first member to be processed 33 is formed of ceramic materials excellent in thermal conductivity such as aluminum nitride (AlN) in a rectangular parallelepiped shape, and the reflective film plane is formed on the whole one plane area of the member.

The reflective film plane is disposed by subjecting the whole one plane area of the first member to be processed 33 to mirror-surface processings such as lapping and polishing, and forming a thin film of metal or metal oxide by a so-called optical film forming means such as vapor deposition, sputtering, and plating.

The reflective film plane formed on the whole one plane area of the first member to be processed 33 in this manner is removed at predetermined intervals in such a manner that a predetermined width is left in a direction crossing at right angles to a longitudinal direction of the first member to be processed 33. A plurality of reflective film planes 20 are thereby left.

Moreover, the grooves 22, 23 are formed along the reflective film plane 20 on opposite sides of each reflective film plane 20 in the surface of the first member to be processed 33 with each reflective film plane 20 formed thereon.

Furthermore, a groove 34 is formed along the reflective film plane 20 and opposite to each reflective film plane 20 in a plane of the first member to be processed 33 opposite to the plane with each reflective film plane 20 formed thereon.

Moreover, a second member to be processed 35 is formed of ceramic materials excellent in thermal conductivity such as aluminum nitride (AlN) in the rectangular parallelepiped shape, and the grooves 34 are formed in one plane of the member at intervals similar to those of the first member to be processed 33.

Furthermore, a third member to be processed 36 is molded of the same material as the materials of the first and second members to be processed 33, 35, and the reflective film plane 20 and grooves 22, 23 are formed on one plane of the third member similarly as the first member to be processed 33.

Here, glass materials 21 as respective adhesive mediums are charged into the respective grooves 34 formed in the first and second members to be processed 33, 35.

Moreover, the first to third members to be processed 33, 35, 36 are attached to one another in a relation in which the grooves 34 are positioned in middle portions between the respective reflective film planes 20 disposed adjacent to each other in the same plane. Thereafter, the entirety is heated and the glass material 21 is molten.

In this case, gaps are generated between the first member to be processed 33 and the second member to be processed 35, and between the first member to be processed 33 and the third member to be processed 36 by the reflective film plane 20.

Therefore, the heated and molten glass material 21 is diffused in the gap by the capillary phenomenon. Thereafter, when the entirety is cooled, the first to third members to be processed 33, 35, 36 are bonded to one another via the glass material 21, and here a bonded block is formed.

The glass material 21 is inhibited from being diffused by the grooves 22, 23 on opposite sides of the reflective film plane 20. Therefore, the glass material 21 is prevented from permeating into the surface of the reflective film plane 20, and the glass material 21 is prevented from adhering to the surface of the reflective film plane 20.

Figure 3:
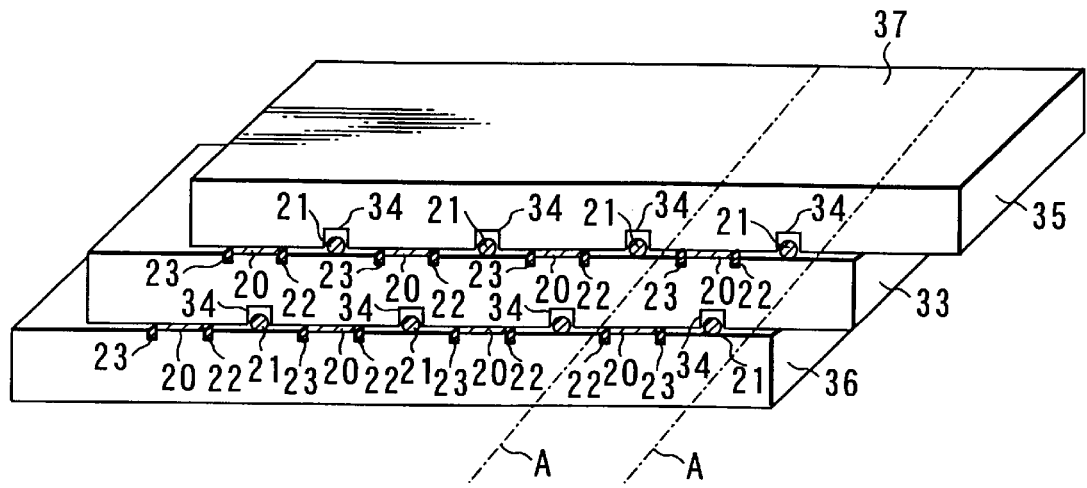
FIG. 3 is a perspective view showing one process of the manufacturing method of the substrate unit in the first embodiment.

Additionally, FIG. 3 shows an example in which the second and third members to be processed 35, 36 are attached to opposite surfaces of the first member to be processed 33, respectively. However, for example, one or a plurality of members to be processed constituted similarly as the first member to be processed 33 may be disposed between the first member to be processed 33 and the third member to be processed 36 in order to form the bonded block.

Subsequently, as shown by a dashed line A in FIG. 3, the bonded block formed as described above is cut along a longitudinal direction of the reflective film plane 20 at a predetermined angle from a side surface so that one reflective film plane 20 of the first member to be processed 33 and one reflective film plane 20 of the third member to be processed 36 are included. A block 37 is thus obtained. In this case, a cut angle, for example, of 45° is selected with respect to the reflective film plane 20.

Figure 4:
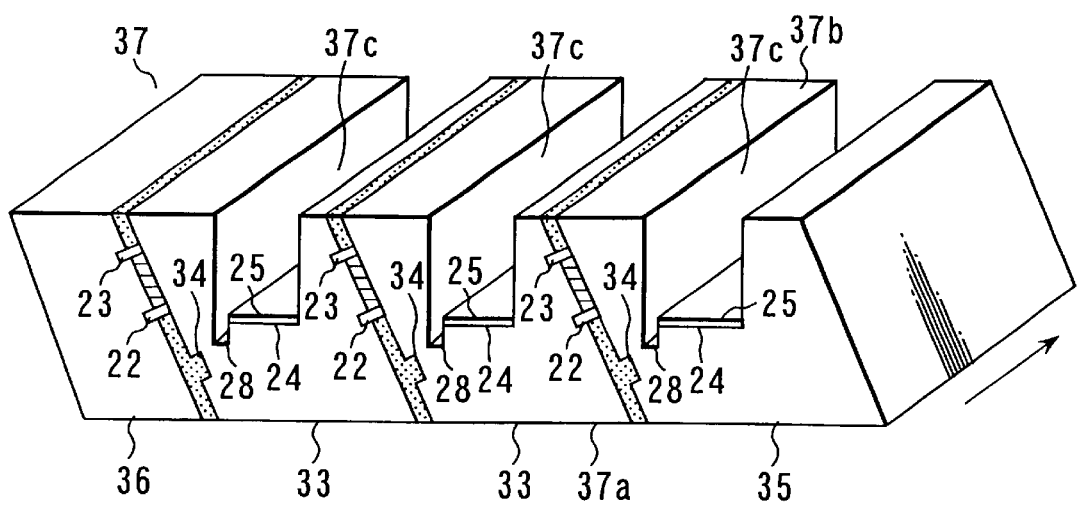
FIG. 4 is a perspective view showing another process of the manufacturing method of the substrate unit in the first embodiment.

FIG. 4 shows that the block 37 cut/divided as described above is subjected to a processing for obtaining the LD attachment surface 24 for attaching the LD 16. In an example of FIG. 4, however, two first members to be processed 33 are disposed between the second member to be processed 35 and the third member to be processed 36.

In FIG. 4, a bottom surface 37a and top surface 37b of the block 37 are cut surfaces cut along the dashed line A shown in FIG. 3. Moreover, when the bottom surface 37a of the block 37 is disposed as a reference surface of the subsequent processing with respect to the block 37 in a horizontal state, a cutout portion 37c is formed in a vertical direction to the bottom surface 37a from the top surface 37b by a grindstone processing, and the LD attachment surface 24 is formed on the bottom surface of the cutout portion 37c. In this case, a groove 28 is additionally formed along an end of the LD attachment surface 24.

Moreover, the conductive film 25 is formed of gold (Au) on the surface of the LD attachment surface 24 by methods such as sputtering, vapor deposition, and plating.

Subsequently, with respect to the block 37 disposed in the position shown in FIG. 4, a cutout portion directed to the bottom surface 37a from the top surface 37b of the block 37 is formed by the grindstone processing in the direction crossing at right angles to the cutout portion 37c in a position at a predetermined distance from one side surface of the block. The PD attachment surface 29 is formed on the bottom surface of the cutout portion. In this case, the groove 31 is additionally formed along the end of the PD attachment surface 29 (see FIG. 6).

Similarly, the cutout portion is formed in the direction crossing at right angles to the cutout portion 37c in a position at a predetermined distance from the position in which the PD attachment surface 29 is formed, and the PD attachment surface 29 is formed. That is, the PD attachment surface 29 is successively formed at a predetermined interval in the depth direction (arrow direction) of the block 37 shown in FIG. 4.

In the aforementioned grindstone processing step, since the reflective film plane 20 is covered by the bonded/connected members to be processed 33, 35, and prevented from being damaged, reflectance is prevented from being deteriorated.

Additionally, the conductive film 25 shown in FIG. 4 may be formed after the PD attachment surface 29 is formed.

Figure 5:
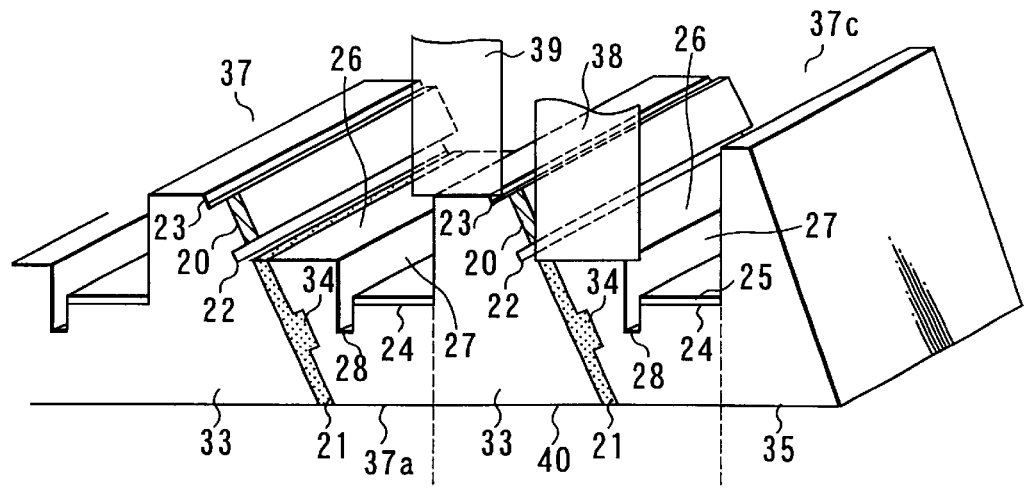
FIG. 5 is a perspective view showing still another process of the manufacturing method of the substrate unit in the first embodiment.

FIG. 5 shows a step of further subjecting the block 37 disposed in the position shown in FIG. 4 to the grindstone processing, and exposing the reflective film plane 20.

That is, a rotating grindstone 38 is attached to a position between the cutout portion 37c of the second member to be processed 35, and the bonded/connected portion of the first and second members to be processed 33, 35, and moved to the bottom surface 37a in a vertical direction, until a corner of the grindstone reaches the vicinity of the groove 22.

Moreover, a rotating grindstone 39 is attached to the position between the cutout portion 37c of the first member to be processed 33, and the bonded/connected portion of the first and second members to be processed 33, 35, and moved to the bottom surface 37a in the vertical direction, until the corner of the grindstone reaches the vicinity of the groove 23.

As described above, the second member to be processed 35 covering the reflective film plane 20 is removed by the processing by the grindstones 38, 39, and the reflective film plane 20 is exposed.

Moreover, a portion including the plane cut by the grindstone 38 forms the protrusion 26, and a wall continued from the groove 28 constitutes the reference surface 27 for attachment of the LD 16.

When the first to third members to be processed 33, 35, 36 are subjected to the aforementioned step, each reflective film plane 20 can be exposed.

Subsequently, when the end of the block 37 opposite to the groove 28 of the LD attachment surface 24 is cut as shown by a dotted line B in FIG. 5, a block 40 is obtained.

Figure 6:
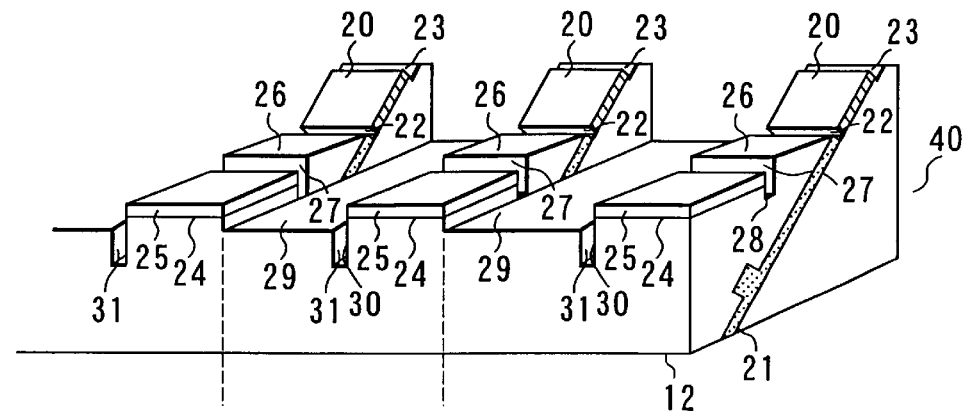
FIG. 6 is an explanatory view of still another process of the manufacturing method of the substrate unit in the first embodiment.

FIG. 6 shows the block 40 formed as described above. It is understood that a portion with the PD attachment surface 29 formed therein is clearly divided from a portion constituted of the reflective film plane 20, protrusion 26, LD attachment surface 24, conductive film 25, respective grooves 22, 23, 28, and the like.

Moreover, the groove 31 is formed in the boundary between the portion with the PD attachment surface 29 formed therein and the portion with the LD attachment surface 24 formed therein, and the vertical wall 30 of the portion with the LD attachment surface 24 formed therein, continued to the groove 31, is the reference surface for attaching the PD 17.

Furthermore, when the block 40 is cut along the end of the PD attachment surface 29 opposite to the groove 31 as shown by a dotted line C in FIG. 6, the substrate unit 12 is obtained.

According to the aforementioned manufacturing process, the substrate unit 12 which can easily be manufactured and which is superior in mass productivity and high in precision can be formed.

Figure 7:
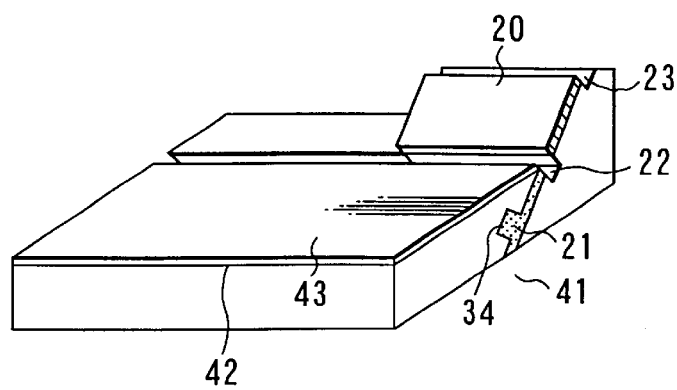
FIG. 7 is a perspective view showing a modification example in the first embodiment.

FIG. 7 shows a modification example of the aforementioned substrate unit. In a substrate unit 41 shown in the modification example, the LD attachment surface and PD attachment surface are formed on the same plane 42, and a conductive film 43 is formed on the plane 42.

A method of constituting the optical head apparatus by this substrate unit 41 comprises, for example, attaching LD to the plane 42, subsequently allowing the LD to emit light, and positioning PD on the plane 42 based on this light emitting point.

The reflective film plane 20 is disposed on one side of the groove 31 formed in the substrate unit 12 in the first embodiment, but may be formed in a middle portion of the substrate unit 12 over the groove 31, on a side opposite to the LD via the groove 31, and on the whole substrate unit 12 in a width direction in accordance with an arrangement design of an optical system, LD 16 and PD 17.

Moreover, the example in which an insulating ceramic high in thermal conductivity is used as the member forming the substrate unit 12 has been described above, but it is also possible to form the unit of a conductive metal high in thermal conductivity, such as copper (Cu), depending on earth designs of the LD 16, PD 17 and wiring substrate 32.

Furthermore, in this case, when a film of metal such as gold (Au) is added, the LD 16 can directly be bonded to the substrate unit 12 without requiring the conductive film 25.

Additionally, as described above, the number of first members to be processed 33 laminated between the second member to be processed 35 and the third member to be processed 36 can appropriately be selected as the occasion demands.

Moreover, the number of reflective film planes 20 and grooves 22, 23, 34 formed on the first to third members to be processed 33, 35, 36 can appropriately be increased/decreased as the occasion demands.

Furthermore, in addition to the glass material 21, a bonding connection by silver wax, solder, organic adhesive, and the like, or diffusion bonding by heating/pressing can be used to connect the first to third members to be processed 33, 35, 36.

Additionally, the manufacturing method of the substrate unit 12 described with reference to FIGS. 3 to 7 is efficient, but the manufacturing method of the substrate unit 12 according to the present invention is not necessarily limited to this procedure.

For example, the method may comprise: first cutting the block 37 shown in FIG. 4 in a direction crossing the reflective film plane 20; subjecting the cut block to the processing for forming the LD attachment surface 24, exposing the reflective film plane 20, and forming the protrusion 26; and subsequently cutting the block into a size of the substrate unit 12.

Moreover, it is also possible to form the reflective film plane 20 and conductive films 25, 43 of the same materials such as gold (Au) and silver (Ag). In this case, the method may comprise: subjecting the portion in which the reflective film plane 20 is to be formed to the mirror-surface processing without forming the reflective film plane 20 beforehand; exposing the portion with the reflective film plane 20 to be formed therein by the grindstone processing; and simultaneously forming the reflective film plane 20 and conductive films 25, 43. In this case, the block may be constituted by processing a single member, not a connected member of the first to third members to be processed 33, 35, 36.

According to the substrate unit 12, it is possible to form the reflective film plane 20, LD attachment surface 24 and PD attachment surface 29 on the integrally connected member, and attachment position precision of the LD 16 and PD 17 during assembling can easily be enhanced.

Furthermore, since the LD attachment surface 24 and PD attachment surface 29 are disposed in the same two-dimensional plane, wire bonding for wiring can easily be performed.

Additionally, the manufacturing method of the substrate unit 12 comprises: laminating and bonding the third member to be processed 36 with the reflective film plane 20 formed on one surface thereof, the second member to be processed 35 with the groove 34 for the adhesive medium 21 disposed in one surface thereof, and the first member to be processed 33 with the reflective film plane 20 and groove 34 formed on the respective surfaces thereof; and subjecting the bonded block to the grinding processing, cutting processing, and the like in order to manufacture the substrate unit 12. Therefore, the reflective film plane 20 is not damaged in a middle step, and a large amount of high-quality substrate units 12 can be manufactured.

Figure 8A:
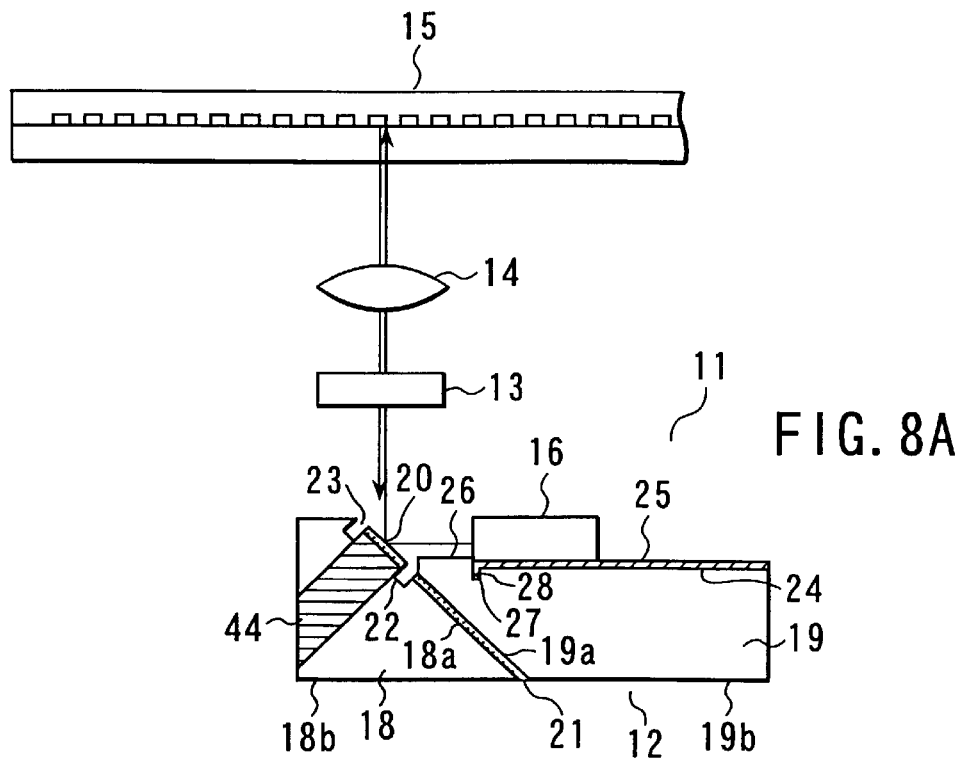
FIGS. 8A to 8C are a front view, top plan view, and side view showing a second embodiment of the substrate unit for the optical head apparatus according to the present invention, and the manufacturing method of the unit.
Figure 8B:
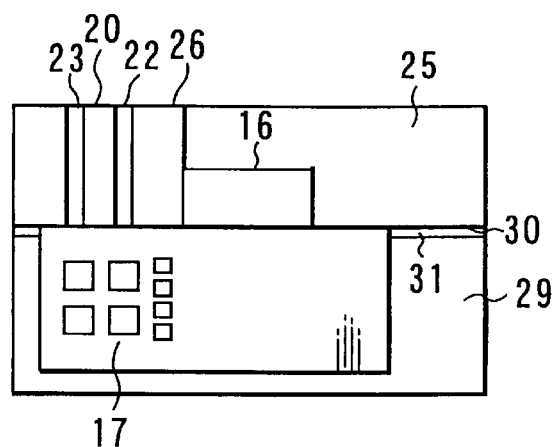
Figure 8C:
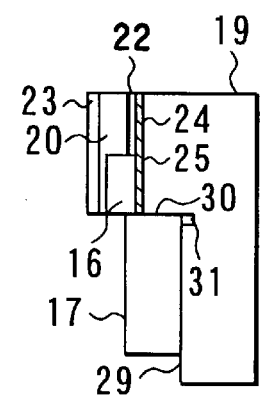

A second embodiment of the present invention will next be described with reference to the drawings. In FIGS. 8A to 8C, the same parts as those of FIGS. 1A to 1C are denoted by the same reference numerals.

That is, the first member 18 holds a metal member 44, having a high thermal conductivity and formed of iron (Fe) or copper (Cu), in a direction substantially crossing at right angles to the slope 18a from the portion of the slope 18a with the reflective film plane 20 formed thereon.

Moreover, the surface of the metal member 44 exposed on a slope 18a side is mirror-surface processed beforehand by means such as lapping and polishing, and the thin film of metal or metal oxide is formed as the reflective film plane 20 on the mirror-surface processed surface.

According to the constitution, since the reflective film plane 20 is formed on the exposed surface of the metal member 44, in addition to the effect of the substrate unit 12 described in the first embodiment, a high-reflectance mirror can be formed.

Moreover, since the thermal conductivity of the metal member 44 is high, a larger heat radiation effect is expected, a function as a heat sink can also be fulfilled, and the shape of the substrate unit 12 can therefore be reduced and thinned.

The manufacturing method of the substrate unit 12 according to the second embodiment will next be described with reference to FIGS. 9 to 12. First, in FIG. 9, a first member to be processed 45 is molded into a rectangular parallelepiped shape in which a plurality of ceramic members having a high thermal conductivity such as aluminum nitride (AlN), and a plurality of iron or copper metal members 44 are alternately superposed upon one another, integrally connected to one another by adhesion or heating/pressing, and the metal members 44 are exposed in band forms at predetermined intervals on the surface.

Moreover, the respective reflective film planes 20 are formed on the surfaces of the respective metal members 44 exposed on one plane of the first member to be processed 45. The reflective film plane 20 is disposed by forming the thin film of metal or metal oxide on the surface of the metal member 44 subjected to the mirror-surface processing, such as lapping and polishing, by a so-called optical film forming means such as vapor deposition, sputtering, and plating.

Furthermore, on the surface of the first member to be processed 45 with each reflective film plane 20 formed thereon, the grooves 22, 23 are formed along the reflective film plane 20 on opposite sides of each reflective film plane 20.

A second member to be processed 46 is disposed opposite to the surface of the first member to be processed 45 with each reflective film plane 20 formed thereon. This second member to be processed 46 is also formed of the ceramic material having a high thermal conductivity such as aluminum nitride (AlN) in the rectangular parallelepiped shape.

Moreover, the glass material which functions as the adhesive member 21 is disposed between the first member to be processed 45 and the second member to be processed 46 excluding the portion of each reflective film plane 20 of the first member to be processed 45.

Furthermore, a third member to be processed 47 having the same constitution as that of the first member to be processed 45 is disposed on the surface of the first member to be processed 45 opposite to the surface thereof with the reflective film plane 20 formed thereon. The third member to be processed 47 is disposed in such a manner that the metal member 44 of the third member is disposed in the middle portion between the metal members 44 of the first member to be processed 45 disposed adjacent to each other.

Additionally, the glass material which functions as the adhesive member 21 is also disposed between the first member to be processed 45 and the third member to be processed 47 excluding the portion of each reflective film plane 20 of the third member to be processed 47.

Moreover, further members to be processed having the same constitution as that of the first member to be processed 45 may also be disposed on the surface of the third member to be processed 47 opposite to the surface thereof with the reflective film plane 20 formed thereon.

The first to third members to be processed 45, 46, 47 disposed as described above are all heated, and the glass material 21 is molten.

In this case, the gaps are generated between the first member to be processed 45 and the second member to be processed 46, and between the first member to be processed 45 and the third member to be processed 47 by the reflective film plane 20.

Therefore, the heated and molten glass material 21 is diffused in the gap by the capillary phenomenon. Thereafter, when the entirety is cooled, the first to third members to be processed 45, 46, 47 are bonded to one another via the glass material 21, and here a bonded block is formed.

The glass material 21 is inhibited from being diffused by the grooves 22, 23 on opposite sides of the reflective film plane 20. Therefore, the glass material 21 is prevented from permeating into the surface of the reflective film plane 20, and the glass material 21 is prevented from adhering to the surface of the reflective film plane 20.

Subsequently, as shown by the dashed line A in FIG. 9, the bonded block formed as described above is cut along the longitudinal direction of the reflective film plane 20 at the predetermined angle from the side surface so that one reflective film plane 20 of the first member to be processed 45 and one reflective film plane 20 of the third member to be processed 47 are included. A block 48 is thus obtained. In this case, the cut angle, for example, of 45° is selected with respect to the reflective film plane 20.

Figure 10:
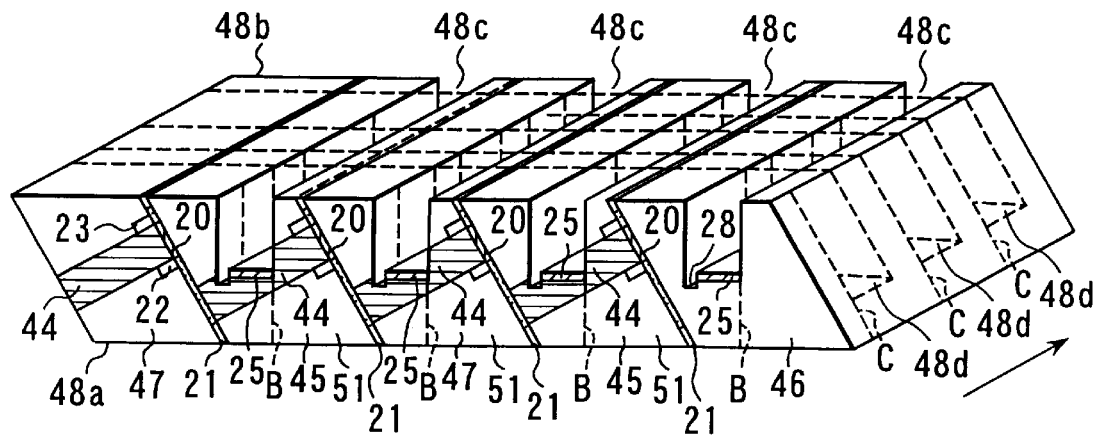
FIG. 10 is a perspective view showing another process of the manufacturing method of the substrate unit in the second embodiment.

FIG. 10 shows that the block 48 cut/divided as described above is subjected to the processing for obtaining the LD attachment surface 24 for attaching the LD 16. In an example of FIG. 10, however, two first members to be processed 45 and two third members to be processed 47 are included.

Figure 9:
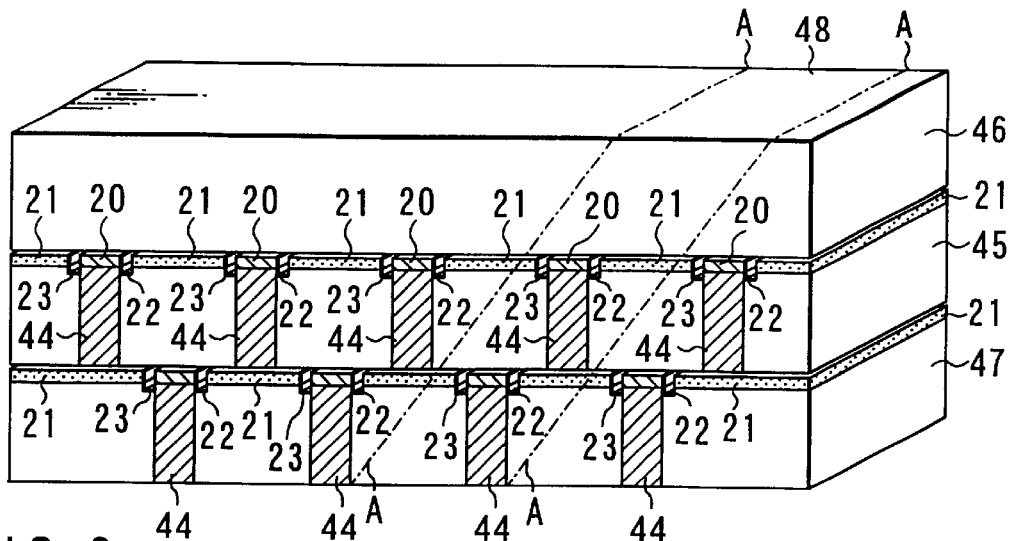
FIG. 9 is a perspective view showing one process of the manufacturing method of the substrate unit in the second embodiment.

In FIG. 10, a bottom surface 48a and top surface 48b of the block 48 are cut surfaces cut along the dashed line A shown in FIG. 9. Moreover, when the bottom surface 48a of the block 48 is disposed as the reference surface of the subsequent processing with respect to the block 48 in the horizontal state, a cutout portion 48c is formed by the grindstone processing in a vertical direction to the bottom surface 48a from the top surface 48b, and the LD attachment surface 24 is formed on the bottom surface of the cutout portion 48c. In this case, the groove 28 is additionally formed along the end of the LD attachment surface 24.

Moreover, the conductive film 25 is formed of gold (Au) by methods such as sputtering, vapor deposition, and plating on the surface of the LD attachment surface 24.

Subsequently, with respect to the block 48 disposed in the position shown in FIG. 10, a cutout portion 48d directed to the bottom surface 48a from the top surface 48b of the block 48 is formed by the grindstone processing in the direction crossing at right angles to the cutout portion 48c in the position at the predetermined distance from one side surface of the block. The PD attachment surface 29 is formed on the bottom surface of the cutout portion 48d. In this case, the groove 31 is additionally formed along the end of the PD attachment surface 29 (see FIG. 12).

Similarly, the cutout portion 48d is formed in the direction crossing at right angles to the cutout portion 48c in a position at a predetermined distance from the position in which the PD attachment surface 29 is formed, and the PD attachment surface 29 is formed. That is, the PD attachment surface 29 is successively formed at the predetermined interval in the depth direction (arrow direction) of the block 48 shown in FIG. 10.

In the aforementioned grindstone processing step, since the reflective film plane 20 is covered by the bonded/connected members to be processed 45, 46, 47, and prevented from being damaged, reflectance is prevented from being deteriorated.

Additionally, the conductive film 25 shown in FIG. 10 may be formed after the PD attachment surface 29 is formed.

Figure 11:
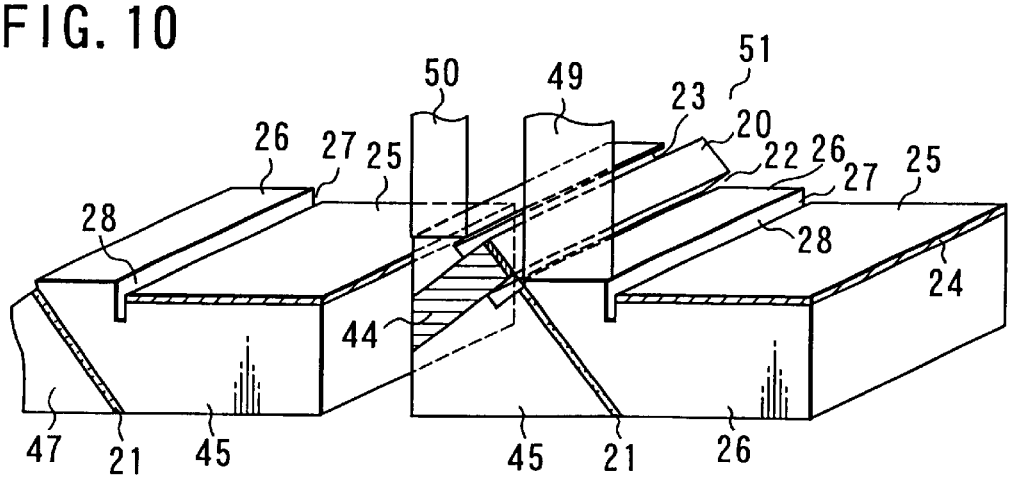
FIG. 11 is a perspective view showing still another process of the manufacturing method of the substrate unit in the second embodiment.

FIG. 11 shows a step of further subjecting the block 48 disposed in the position shown in FIG. 10 to the grindstone processing, and exposing the reflective film plane 20.

That is, a rotating grindstone 49 is attached to a position between the cutout portion 48c of the second member to be processed 46, and the bonded/connected portion of the first and second members to be processed 45, 46, and moved to the bottom surface 48a in the vertical direction, until the corner of the grindstone reaches the vicinity of the groove 22.

Moreover, a rotating grindstone 50 is attached to the position between the cutout portion 48c of the first member to be processed 45, and the bonded/connected portion of the first and second members to be processed 45, 46, and moved to the bottom surface 48a in the vertical direction, until the corner of the grindstone reaches the vicinity of the groove 23.

As described above, the second member to be processed 46 covering the reflective film plane 20 is removed by the processing by the grindstones 49, 50, and the reflective film plane 20 is exposed.

Moreover, the portion including the plane cut by the grindstone 49 forms the protrusion 26, and the wall continued from the groove 28 constitutes the reference surface 27 for attachment of the LD 16.

When the first to third members to be processed 45, 46, 47 are subjected to the aforementioned step, each reflective film plane 20 can be exposed.

Subsequently, when the end of the block 48 opposite to the groove 28 of the LD attachment surface 24 is cut as shown by the dotted line B in FIG. 10, a block 51 is obtained.

Figure 12:
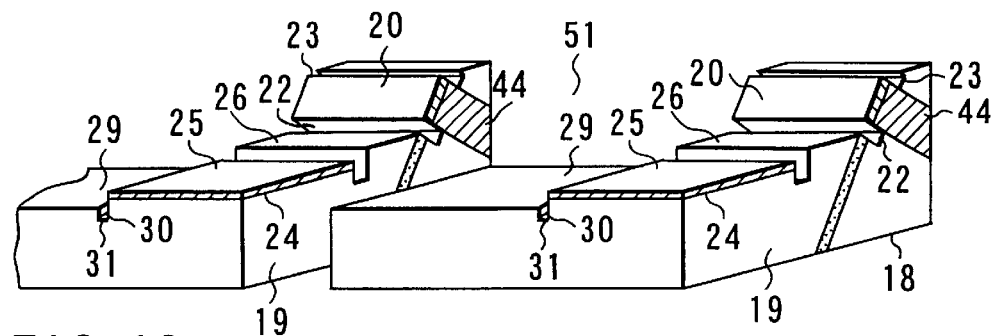
FIG. 12 is a perspective view showing still another process of the manufacturing method of the substrate unit in the second embodiment.

FIG. 12 shows the block 51 formed as described above. It is understood that the portion with the PD attachment surface 29 formed therein is clearly divided from the portion constituted of the reflective film plane 20, protrusion 26, LD attachment surface 24, conductive film 25, respective grooves 22, 23, 28, and the like.

Moreover, the groove 31 is formed in the boundary between the portion with the PD attachment surface 29 formed therein and the portion with the LD attachment surface 24 formed therein, and the vertical wall 30 of the portion with the LD attachment surface 24 formed therein, continued to the groove 31, is the reference surface for attaching the PD 17.

Furthermore, when the block 51 is cut along the end of the PD attachment surface 29 opposite to the groove 31 as shown by the dotted line C in FIG. 10, the substrate unit 12 is obtained.

According to the aforementioned manufacturing process, the substrate unit 12 which can easily be manufactured and which is superior in mass productivity and high in precision can be formed.

According to the aforementioned second embodiment, an effect similar to that of the first embodiment is obtained. Moreover, since the reflective film plane 20 is formed on the exposed surface of the metal member 44, a high-reflectance mirror can be formed.

Moreover, since the thermal conductivity of the metal member 44 is high, a larger heat radiation effect can be expected, and the function as the heat sink can also be fulfilled. This can contribute to miniaturization and thinning of the shape of the substrate unit 12, that is, the shape of the optical head apparatus 11.

Furthermore, various modifications described in the first embodiment can appropriately be applied in the second embodiment.

The modification examples of the first and second embodiments will next be described. The modification example can be applied in common to the first and second embodiments, but the application to the first embodiment will be described here.

Figure 13:
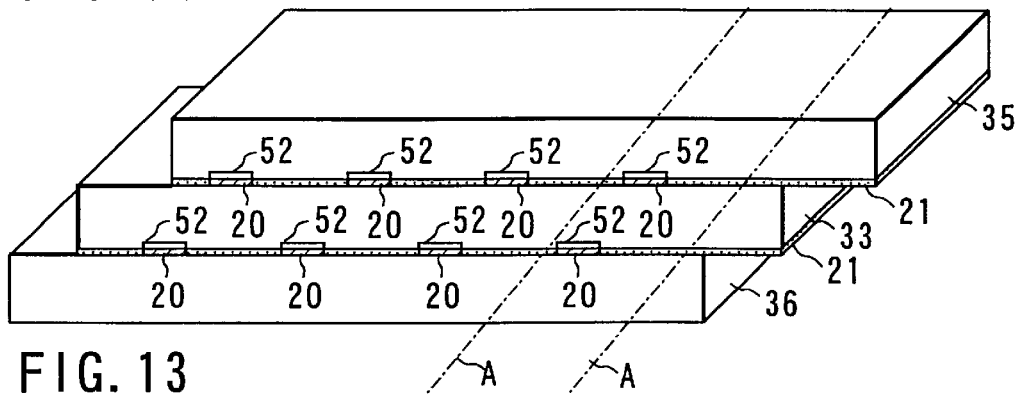
FIG. 13 is a perspective view showing one process of the modification example in the first and second embodiments.
Figure 14:
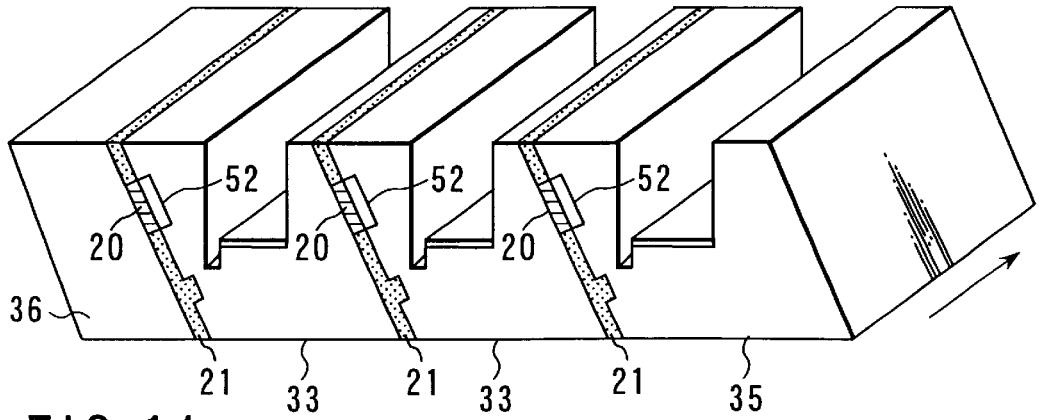
FIG. 14 is a perspective view showing another process of the modification example in the first and second embodiments.

That is, in FIGS. 13 and 14, the same parts as those of FIGS. 3 and 4 are denoted by the same reference numerals. The grooves 22, 23 formed along the opposite sides of each reflective film plane 20 are not formed in the first and third members to be processed 33, 36 with a plurality of reflective film planes 20 formed therein.

Moreover, for the second and first members to be processed 35, 33, a groove 52 having substantially the same width as that of the reflective film plane 20 is formed in a portion disposed opposite to each reflective film plane 20 of the first and third members to be processed 33, 36 while the first to third members to be processed 33, 35, 36 are laminated. While the first to third members to be processed 33, 35, 36 are laminated, the groove 52 is formed in such a depth that the bottom surface of the groove does not contact the reflective film plane 20.

Here, the glass material which functions as the adhesive member 21 is disposed between the first and second members to be processed 33, 35 and between the first and third members to be processed 33, 36 excluding the portions of the reflective film planes 20, the entirety is heated, and the glass material 21 is molten.

In this case, the gaps are generated between the first member to be processed 33 and the second member to be processed 35, and between the first member to be processed 33 and the third member to be processed 36 by the reflective film plane 20.

Therefore, the heated and molten glass material 21 is diffused in the gap by capillary phenomenon. Thereafter, when the entirety is cooled, the first to third members to be processed 35, 35, 36 are bonded to one another via the glass material 21, and here the bonded block is formed.

Figure 15:
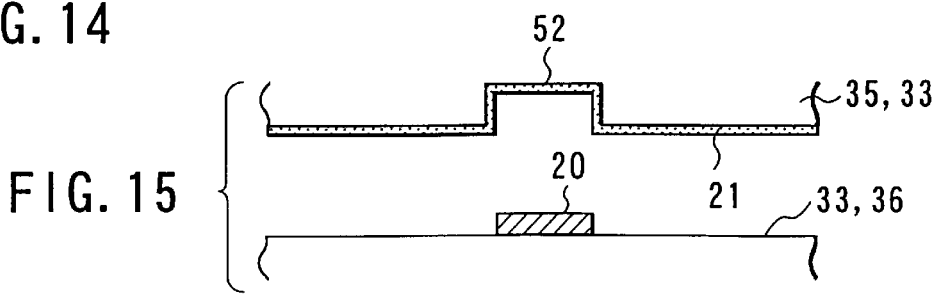
FIG. 15 is a side view showing the modification example in the first and second embodiments.

In this case, as shown in FIG. 15, the diffused glass material 21 enters the corresponding groove 52 formed in the reflective film plane 20. Therefore, the glass material 21 is prevented from permeating into the surface of the reflective film plane 20, and the glass material 21 is prevented from adhering to the surface of the reflective film plane 20.

As described above, according to means for forming the grooves 52 opposite to the reflective film planes 20 formed in the first and third members to be processed 33, 36 in the second and first members to be processed 35, 33, the manufacturing operation can be facilitated as compared with the means for forming the grooves 22, 23 on opposite sides of each reflective film plane 20.

Figure 16:
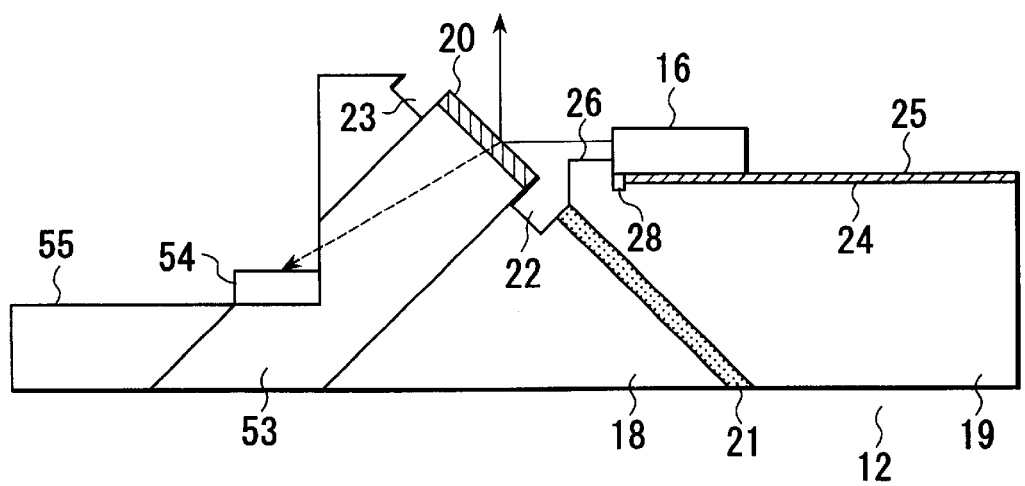
FIG. 16 is a front view showing a third embodiment of the substrate unit for the optical head apparatus according to the present invention, and the manufacturing method of the unit.

A third embodiment of the present invention will next be described with reference to the drawings. In FIG. 16, the same parts as those of FIG. 8A are denoted by the same reference numerals.

That is, a transmission member 53 for passing light, such as glass, is used instead of the metal member 44, and the reflective film plane 20 is formed in a half mirror. Moreover, a monitor PD attachment surface 55 for disposing a monitor PD 54 is formed in a portion disposed opposite to a back side of the reflective film plane 20 of the substrate unit 12.

Here, some of the laser light emitted from the LD 16 is transmitted through the half mirror (reflective film plane 20) and transmission member 53 and guided to the monitor PD 54. An output light amount of the LD 16 is monitored by the monitor PD 54, and an LD driving circuit (not shown) is controlled so that a light emitting output of the LD 16 is constant.

The half mirror (reflective film plane 20) can be formed by a known technique. That is, the half mirror is obtained by forming the thin film of metal or metal oxide on the mirror-surface processed surface by so-called optical film forming means such as vapor deposition, sputtering, and plating.

Since it is necessary to keep the output of the LD 16 to be constant during writing of the information to the optical disc 15, monitoring and controlling of an operation state of the LD 16 by the monitor PD 54 are broadly performed. However, according to the third embodiment, a position precision of the monitor PD 54 to the LD 16 can be enhanced, and the LD 16 can securely and efficiently be controlled.

Moreover, as in other embodiments, the substrate unit 12 can be manufactured with satisfactory mass productivity. Additionally, the reflected light from the optical disc 15 is received by the PD 17 disposed as in FIG. 8B.

INDUSTRIAL APPLICABILITY

As described above in detail, according to the present invention, there can be provided a substrate unit for an optical head apparatus, in which LD and PD can be disposed on the same two-dimensional plane, a positioning operation of the LD and PD is facilitated, and an operation efficiency of wire bonding can also be enhanced.

Moreover, according to the present invention, there can be provided a manufacturing method of the substrate unit for the optical head apparatus in which the substrate unit for the optical head apparatus can be manufactured with high precision and satisfactory productivity.

Therefore, the present invention can broadly be utilized in a disc recording/reproducing apparatus for recording or reproducing information with respect to optical discs such as a digital video disc (DVD) and compact disc (CD).

What is claimed is:

1. A substrate unit for an optical head apparatus, comprising:

a light emitting element attachment surface for attaching a light emitting element which emits a laser light substantially in parallel to a surface with the element to be attached thereto;

a light reflecting surface for changing a direction of a light axis of the laser light emitted from said light emitting element attached to the light emitting element attachment surface by a predetermined angle by reflection; and a light detecting element attachment surface, formed on the same two-dimensional plane as a plane of said light emitting element attachment surface, for attaching a light detecting element which receives a light incident from the outside, wherein said substrate unit is constituted by bonding a first member to a second member, and said light reflecting surface is formed along a bonded surface of said first member and said second member.

2. The substrate unit for the optical head apparatus according to claim 1, wherein said light reflecting surface is constituted by forming a film by a metal or a metal oxide on a mirror-surface processed portion in which said light reflecting surface of said first member is to be formed.

3. The substrate unit for the optical head apparatus according to claim 1, wherein said first member is formed so that a metal member is sandwiched between insulating members, and said light reflecting surface is constituted by forming a film by a metal or a metal oxide on a mirror-surface processed surface of said metal member exposed from said first member.

4. The substrate unit for the optical head apparatus according to any one of claims 1,2 or 3, wherein a groove is formed along an edge of said light reflecting surface in said first member.

5. The substrate unit for the optical head apparatus according to claim 1, wherein said first member is formed so that a transmission member for passing light is sandwiched between insulating members, said light reflecting surface is formed as a half mirror in which a film is formed by a metal or a metal oxide on a mirror-surface processed surface of said transmission member, and an attachment surface of a light receiving element for a monitor for receiving laser light reflected by said light reflecting surface via said transmission member is formed opposite to said transmission member in said substrate unit.

6. A substrate unit for an optical head apparatus, comprising:

a light emitting element attachment surface for attaching a light emitting element which emits a laser light substantially in parallel to a surface with the element to be attached thereto;

a light reflecting surface for changing a direction of a light axis of the laser light emitted from said light emitting element attached to the light emitting element attachment surface by a predetermined angle by reflection; and a light detecting element attachment surface, formed on the same two-dimensional plane as a plane of said light emitting element attachment surface, for attaching a light detecting element which receives a light incident from the outside, wherein a reference surface for positioning said light emitting element is formed in the vicinity of said light emitting element attachment surface in said substrate unit.

7. A substrate unit for an optical head apparatus, comprising:

a light emitting element attachment surface for attaching a light emitting element which emits a laser light substantially in parallel to a surface with the element to be attached thereto;

a light reflecting surface for changing a direction of a light axis of the laser light emitted from said light emitting element attached to the light emitting element attachment surface by a predetermined angle by reflection; and a light detecting element attachment surface, formed on the same two-dimensional plane as a plane of said light emitting element attachment surface, for attaching a light detecting element which receives a light incident from the outside, wherein a reference surface for positioning said light detecting element is formed in the vicinity of said light detecting element attachment surface in said substrate unit.

8. A substrate unit for an optical head apparatus, comprising:

a light emitting element attachment surface for attaching a light emitting element which emits a laser light substantially in parallel to a surface with the element to be attached thereto;

a light reflecting surface for changing a direction of a light axis of the laser light emitted from said light emitting element attached to the light emitting element attachment surface by a predetermined angle by reflection; and a light detecting element attachment surface, formed on the same two-dimensional plane as a plane of said light emitting element attachment surface, for attaching a light detecting element which receives a light incident from the outside, wherein said light emitting element attachment surface and said light detecting element attachment surface are formed as planes which are parallel to each other and different from each other in height.

9. A substrate unit for an optical head apparatus, comprising:

a light emitting element attachment surface for attaching a light emitting element which emits a laser light substantially in parallel to a surface with the element to be attached thereto;

a light reflecting surface for changing a direction of a light axis of the laser light emitted from said light emitting element attached to the light emitting element attachment surface by a predetermined angle by reflection: and a light detecting element attachment surface, formed on the same two-dimensional plane as a plane of said light emitting element attachment surface, for attaching a light detecting element which receives a light incident from the outside, wherein said substrate unit is constituted by bonding the first member to the second member, said light reflecting surface is being formed on said first member, said light emitting element attachment surface is formed on said second member, and said light detecting element attachment surface is formed on said first member, on said second member, or over said first and second members.

10. A substrate unit for an optical head apparatus, comprising:

a light emitting element attachment surface for attaching a light emitting element which emits a laser light substantially in parallel to a surface with the element to be attached thereto;

a light reflecting surface for changing a direction of a light axis of the laser light emitted from said light emitting element attached to the light emitting element attachment surface by a predetermined angle by reflection;

a light detecting element attachment surface, formed on the same two-dimensional plane as a plane of said light emitting element attachment surface, for attaching a light detecting element which receives a light incident from the outside;

a first member in which a slope having inclination is formed at a predetermined angle with respect to a reference surface, and said light reflecting surface is formed on a part of the slope; and a second member which is bonded to the slope of the first member, and in which said light emitting element attachment surface is formed.

11. A manufacturing method of a substrate unit for an optical head apparatus, comprising:

a step of forming a plurality of light reflecting surfaces on one plane of a first member to be processed formed substantially in a rectangular parallelepiped shape;

a step of attaching one plane of a second member to be processed formed substantially in the rectangular parallelepiped shape to the plane of said first member to be processed with the plurality of light reflecting surfaces formed thereon in the forming step, disposing an adhesive medium in a portion other than said light reflecting surface, and forming a bonded block in which said first and second members to be processed are connected to each other;

a step of cutting the bonded block formed in the forming step at a predetermined angle with respect to the light reflecting surface, and dividing the bonded block into a plurality of blocks so that one light reflecting surface is included in each block; and a step of disposing a cut surface of the block obtained in the forming step as a reference surface of a processing, and forming the substrate unit from the block, comprising a light emitting element attachment surface for attaching a light emitting element which emits laser light to said light reflecting surface, and a light detecting element attachment surface for attaching a light detecting element, formed on the same two-dimensional plane as the light emitting element attachment surface, for receiving light incident from the outside.

12. The manufacturing method of the substrate unit for the optical head apparatus according to claim 11, wherein said first step comprises a step of forming a groove along an edge of said light reflecting surface in one plane of said first member to be processed.

13. The manufacturing method of the substrate unit for the optical head apparatus according to claim 11, wherein said second step comprises a step of forming grooves in portions disposed opposite to a plurality of light reflecting surfaces formed in said first member to be processed in one plane of said second member to be processed.

* * * * *